J. KIRKWOOD.
NON-SKID CHAIN.
APPLICATION FILED FEB. 8, 1916.
1,205,752. Patented Nov. 21, 1916.
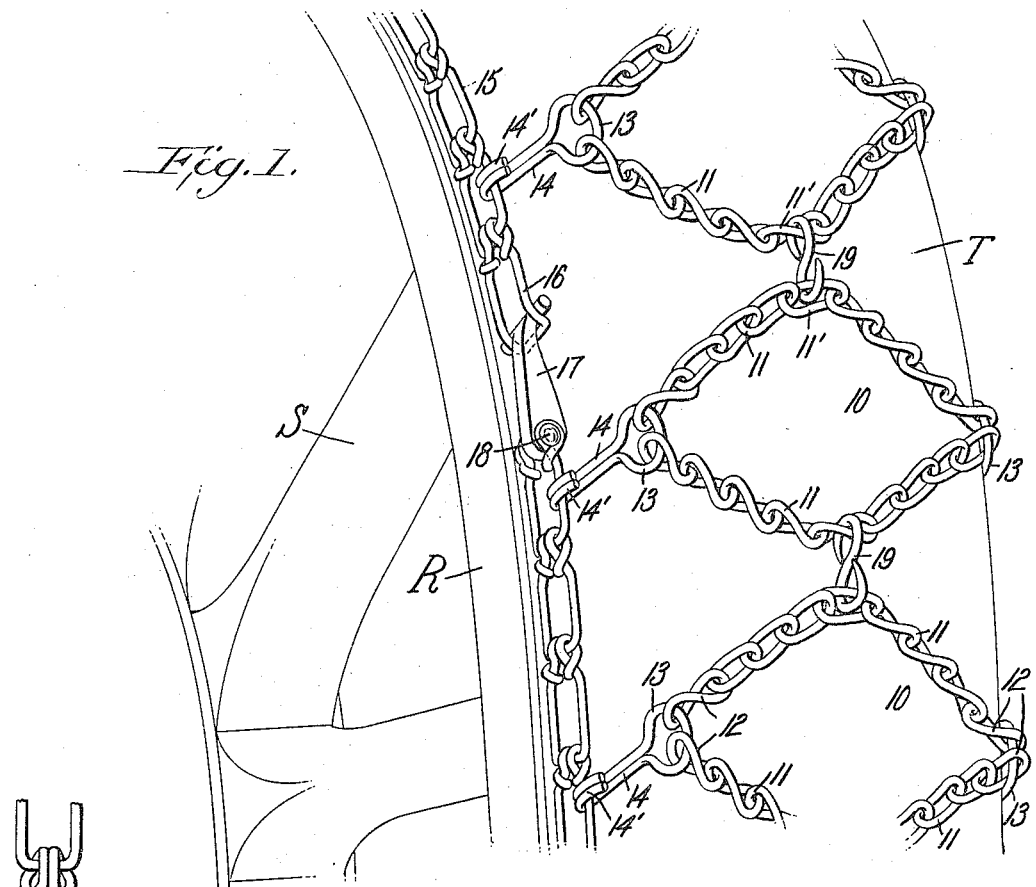
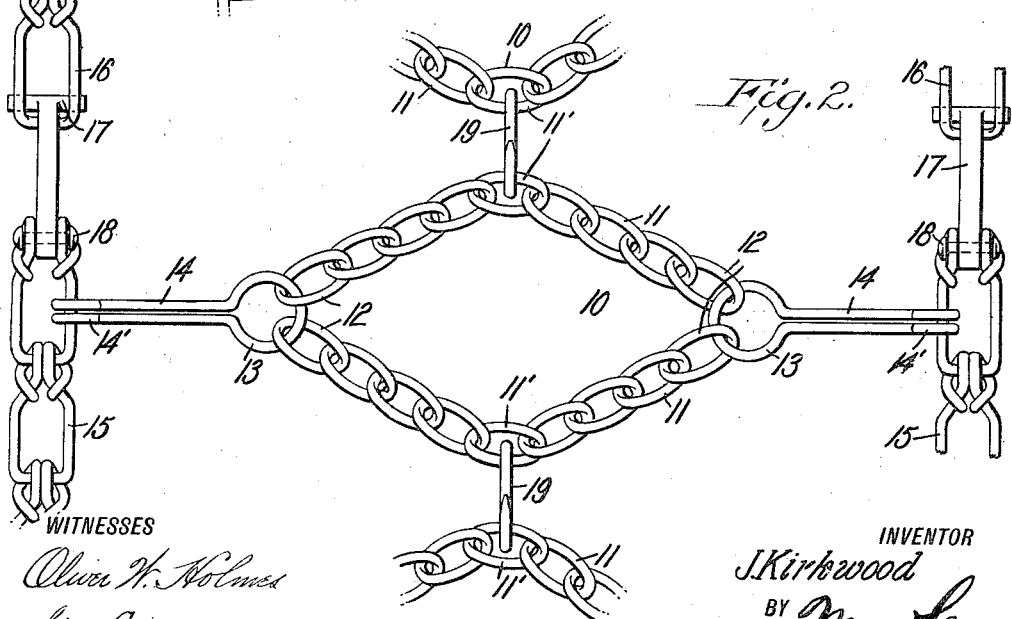

UNITED STATES PATENT OFFICE.

JOHN KIRKWOOD, OF LENOX, MASSACHUSETTS.

NON-SKID CHAIN.

1,205,752.  Specification of Letters Patent.  Patented Nov. 21, 1916.

Application filed February 8, 1916. Serial No. 76,942.

*To all whom it may concern:*

Be it known that I, JOHN KIRKWOOD, a citizen of the United States, and a resident of Lenox, in the county of Berkshire and State of Massachusetts, have invented a new and Improved Non-Skid Chain, of which the following is a full, clear, and exact description.

This invention relates to vehicle wheels and has particular reference to a non-skid attachment for pneumatic tires or the like.

Among the objects of the invention is to improve the construction and operation of non-skid chains for rubber-tired wheels in such a manner as to make them more effective as to their gripping property, more durable and satisfactory in action, and otherwise to simplify and cheapen as well as to generally improve this type of devices.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 1 is a perspective view of a portion of a wheel having a pneumatic tire protected or covered by my improvement; and Fig. 2 is a plan view of the connected end portions of the device laid out flat.

Referring now more particularly to the drawings I show a diagrammatic representation of a wheel having spokes S, a rim R, and a pneumatic tire T of any suitable or approved construction, the same *per se* constituting no part of this invention.

The so-called non-skid chain constituting the subject of this invention is made up of a number of connected short chain elements, connecting links and easily manipulated connecting devices for the ends of the binder chains.

More definitely stated, the improved non-skid chain comprises a circular series of tread elements 10 each consisting of a pair of short chains 11 extending transversely of the tread portion of the tire, and when in assembled or operative position is substantially diamond-shaped. The end links 12 of these chains are connected in pairs to the eyes 13 of long substantially straight hanger links 14 having hooks 14' at their inner ends, the term inner being employed with reference to the center of the wheel. The hanger links 14 on opposite sides of the tire through their eyes 13 hold the end links 12 of the tread elements in pairs, the links of each pair being closely related. The length of the chains 11 is such that practically all of the links of the chains 11 lie in or along the tread portion of the tire or in position to be in more or less positive contact with the roadway.

The above referred to binder chains, shown at 15, are of any suitable character of links, but having a loop link 16 at one end, the loop being deflected laterally toward the tire, as shown in Fig. 1, for coöperation with the T-head of a tongue link 17 pivotally connected at 18 to the other end of the same chain. Both binder chains 15 are provided with similar connecting members 16 and 17, said connections being arranged between the same two tread elements 10.

The center link 11' of each tread chain 11 is connected to the similar link of the adjacent chain of the next adjacent tread member by a link 19 which may be of S-form or its equivalent, providing for easy connection or disconnection of the links 11' in transverse alinement with the connections 16 and 17 of the binder chains.

With the construction above described the application of the device to a wheel may be easily effected, and with the tire somewhat deflated the tongue members 17 may be connected with the open loops 16 by projecting the T-heads thereof edgewise through the loops and then turning transversely toward the tire as shown in the drawings, the T-head of each connection lying normally in the concave portion of the loop 16 where it is impossible for the parts to separate when the tire is again inflated. The binder chains extend along the side edges of the tire or rim, and being of a less length than the circumference of the tread there is no possibility for the binder chains slipping outwardly or over the tire. As above premised, the diamond-shaped tread members 10 of the device are of a size to have complete contact with the roadway so as to provide the maximum gripping effect and affording also maximum protection to the tire itself. The hangers 14 are shown as being substantially straight between the eyes 13 and their hooks 14'. While the link 19 adjacent the connections 16 and 17 is shown as open, it is obvious that the connection at this point may be permanent, and the non-skid chain as a whole may be slipped into place over the largest circumference of the tire when the binder chains are loose.

I claim:—

1. A non-skid chain for pneumatic tires comprising two binder chains adapted to extend along the side edges of a tire, a plurality of diamond shaped tread elements adapted to extend transversely of the tire, each element consisting of two short chains and two elongated hanger links, each having at one end an eye engaging the end links of the said two chains and at the other end a hook engaging a link of a binder chain, and a series of detachable links connecting the center links of adjacent chains of adjacent tread elements and spacing them a short distance apart.

2. A non-skid chain arrangement for tires comprising a pair of binder chains spaced apart and adapted to extend along the side edges of a tire, a plurality of diamond-shaped tread elements adapted to extend transversely of the tire and between the said chains, each tread element consisting of two continuous short chains and two elongated hanger links each flexibly attached at one end to the end links of the said two chains of the tread element and detachably held at the other end to the binder chains, and means for flexibly connecting the center links of adjacent chains of the tread elements and spacing them a short distance apart.

JOHN KIRKWOOD.

Witnesses:
GEORGE A. MOLE,
KATE FIELDING.